United States Patent [19]

Yamada

[11] Patent Number: 5,796,614
[45] Date of Patent: Aug. 18, 1998

[54] LEVEL-BY-LEVEL EXPLOSION METHOD FOR MATERIAL REQUIREMENTS PLANNING

[75] Inventor: Miho Yamada, Tokyo, Japan

[73] Assignee: NEC Corporation, Tokyo, Japan

[21] Appl. No.: 422,851

[22] Filed: Apr. 17, 1995

[30]  Foreign Application Priority Data

Apr. 21, 1994 [JP] Japan ................................ 6-082913
Sep. 20, 1994 [JP] Japan ................................ 6-225132
Sep. 28, 1994 [JP] Japan ................................ 6-233347

[51] Int. Cl.$^6$ .............................. G06F 19/00; G09G 7/66
[52] U.S. Cl. .............................. 364/468.13; 364/468.14; 395/229
[58] Field of Search .............................. 364/402, 403, 364/401 R, 406, 468.13, 468.14; 395/208, 209, 229

[56]        References Cited

U.S. PATENT DOCUMENTS

| 4,459,663 | 7/1984 | Dye ........................ 395/229 |
| 4,924,385 | 5/1990 | Dote ........................ 395/600 |
| 5,197,001 | 3/1993 | Mukherjee ................ 364/403 |
| 5,210,686 | 5/1993 | Jernigan ................... 364/403 |
| 5,237,495 | 8/1993 | Morii ....................... 364/401 R |
| 5,260,866 | 11/1993 | Lisinski et al. ............ 364/401 R |
| 5,270,775 | 12/1993 | Suzuki ...................... 355/204 |
| 5,479,343 | 12/1995 | Matoba et al. ............ 364/401 R |
| 5,515,269 | 5/1996 | Willis et al. ............... 395/229 |

FOREIGN PATENT DOCUMENTS

| 63-200950 | 8/1988 | Japan . |
| 3-94326 | 4/1991 | Japan . |
| 3-287357 | 12/1991 | Japan . |
| 4-41164 | 2/1992 | Japan . |

*Primary Examiner*—Reba I. Elmore
*Assistant Examiner*—Robert J. Dolan

[57]         ABSTRACT

Upon starting of MRP processing, material information and product structure stored on a disk are extracted into a material information table and a product structure table, respectively, and the two tables are related with each other such that upon one level explosion in MRP, explosion to lower items can be performed only by designation of an address without retrieving component parts from a parent part. Further, a calendar day table and an operating day table are used to produce a composite calendar table. The composite calendar table is used for important date calculations. Moreover, upon registration into a key area of a management table of demand information contents at a plurality of positions of the key area are replaced with each other. And, upon extraction of the demand information from the management table, contents at a plurality of positions of the key area are replaced with each other.

Consequently, upon ordering processing, the demand information can be extracted in a sorted order from the management table in a very short time.

13 Claims, 20 Drawing Sheets

FIG. 1
(PRIOR ART)

| PART NUMBER | PART NAME | UNIT OF MEASURE | .... |
|---|---|---|---|
| AAA - 001 | | | .... |
| | | | |
| AAA - 007 | | | .... |
| | | | |
| CCC - 001 | | | .... |
| CCC - 002 | | | .... |
| CCC - 003 | | | .... |
| | | | |
| DDD - 111 | | | .... |
| | | | |
| FFF - 001 | | | .... |
| | | | |

FIG. 2
(PRIOR ART)

| PARENT PART NUMBER | COMPONENT PART NUMBER | QUANTITY PER ASSEMBLY | .... |
|---|---|---|---|
| AAA - 007 | CCC - 001 | | .... |
| AAA - 007 | CCC - 003 | | .... |
| AAA - 007 | DDD - 111 | | .... |
| | | | |
| CCC - 001 | DDD - 111 | | .... |
| CCC - 001 | FFF - 001 | | .... |
| CCC - 001 | AAA - 001 | | .... |
| | | | |
| DDD - 111 | AAA - 001 | | .... |
| DDD - 111 | FFF - 001 | | .... |
| | | | |

FIG. 4a
(PRIOR ART)

| TABLE POSITION | CALENDAR DATE |
|---|---|
| 1 | 19940101 |
| 2 | 19940102 |
| 3 | 19940103 |
| 4 | 19940104 |
| 5 | 19940105 |
| 6 | 19940106 |
| 7 | 19940107 |
| 8 | 19940108 |
| 9 | 19940109 |
| 10 | 19940110 |
| 11 | 19940111 |
| . | . |
| 778 | . |
| 779 | . |
| . | . |
| 1093 | 19961228 |
| 1094 | 19961229 |
| 1095 | 19961230 |
| 1096 | 19961231 |

FIG. 4b
(PRIOR ART)

| TABLE POSITION (10) | OPERATING DATE (11) |
|---|---|
| 1 | 19940104 |
| 2 | 19940105 |
| 3 | 19940106 |
| 4 | 19940107 |
| 5 | 19940110 |
| 6 | 19940111 |
| 7 | . |
| 8 | . |
| 9 | . |
| 10 | . |
| 11 | . |
| 12 | . |
| . | . |
| . | . |
| . | . |
| 778 | 19961228 |
| 779 | 19961229 |
| 780 | 19961230 |
| 781 | 19961231 |

| PART NUMBER | PARENT PART NUMBER | REQUIRED DATE | REQUIRED QUANTITY | |
|---|---|---|---|---|
| | | | | |
| a | Y | 1994 07 10 | 5 | |
| a | Y | 1994 07 25 | 2 | |
| a | C | 1994 07 23 | 8 | |
| a | C | 1994 07 27 | 5 | |
| a | C | 1994 08 10 | 7 | |
| a | E | 1994 07 27 | 10 | |
| a | E | 1994 08 05 | 5 | |
| | | | | |

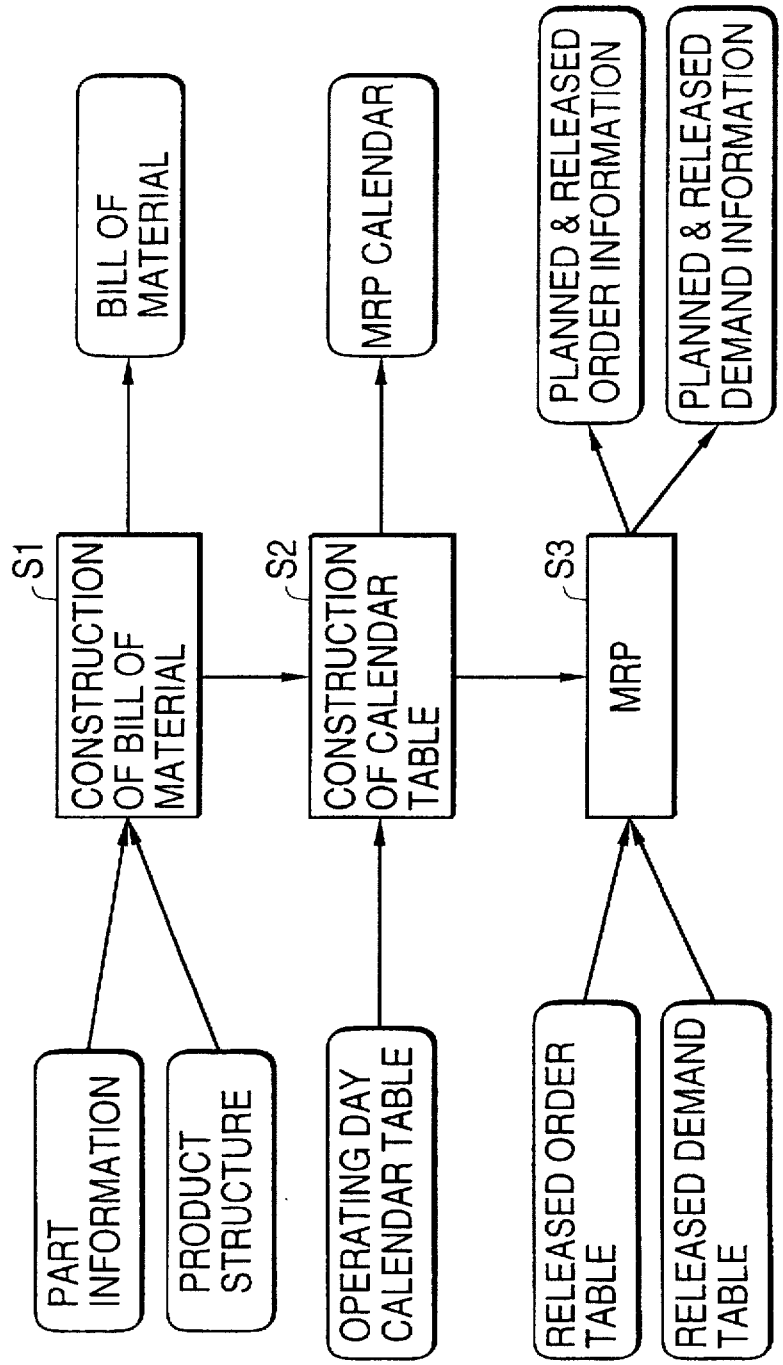

FIG. 8a

| RELATIVE POSITION | PART NUMBER | PRODUCT STRUCTURE ADDRESS | UNIT OF MEASURE | .... |
|---|---|---|---|---|
| 0001 | AAA - 001 | * * * * | | .... |
| | | | | |
| 0151 | AAA - 007 | 0001 | | .... |
| | | | | |
| 0461 | CCC - 001 | 0300 | | .... |
| 0462 | CCC - 002 | * * * * | | .... |
| 0463 | CCC - 003 | * * * * | | .... |
| | | | | |
| 1335 | DDD - 111 | 1571 | | .... |
| | | | | |
| 2333 | FFF - 001 | * * * * | | .... |
| | | | | |

* * * * SIGNIFIES ABSENCE OF COMPONENT PARTS

FIG. 8b

| RELATIVE POSITION 38 | PARENT PART NUMBER 34 | COMPONENT PART NUMBER 35 | PARENT PART ADDRESS 36 | COMPONENT PART ADDRESS 37 | QUANTITY PER ASSEMBLY |
|---|---|---|---|---|---|
| 0001 | AAA-007 | CCC-001 | 0151 | 0461 | ⋮ |
| 0002 | AAA-007 | CCC-003 | 0151 | 0463 | ⋮ |
| 0003 | AAA-007 | DDD-111 | 0151 | 1335 | ⋮ |
| | | | | | |
| 0300 | CCC-001 | DDD-111 | 0461 | 1335 | ⋮ |
| 0301 | CCC-001 | FFF-001 | 0461 | 2333 | ⋮ |
| 0302 | CCC-001 | AAA-001 | 0461 | 0001 | ⋮ |
| | | | | | |
| 1571 | DDD-111 | AAA-001 | 1335 | 0001 | ⋮ |
| 1572 | DDD-111 | FFF-001 | 1335 | 2333 | ⋮ |
| | | | | | |

FIG. 12

| TABLE POSITION | CALENDAR DATE | OPERATING DAY ADDRESS | OPERATING DATE | CALENDAR DAY ADDRESS |
|---|---|---|---|---|
| 1 | 19940101 | 0 | 19940104 | 4 |
| 2 | 19940102 | 0 | 19940105 | 5 |
| 3 | 19940103 | 0 | 19940106 | 6 |
| 4 | 19940104 | 1 | 19940107 | 7 |
| 5 | 19940105 | 2 | 19940110 | 10 |
| 6 | 19940106 | 3 | 19940111 | 11 |
| 7 | 19940107 | 4 | . | . |
| 8 | 19940108 | 4 | . | . |
| 9 | 19940109 | 4 | . | . |
| 10 | 19940110 | 5 | . | . |
| 11 | 19940111 | 6 | . | . |
| . | . | . | . | . |
| 778 | . | . | 19961228 | 1093 |
| 779 | . | . | 19961229 | 1094 |
| . | . | . | | |
| 1093 | 19961228 | 778 | | |
| 1094 | 19961229 | 779 | | |
| 1095 | 19961230 | 779 | | |
| 1096 | 19961231 | 779 | | |

FIG. 15

| TABLE POSITION | CALENDAR DATE | OPERATING DAY CALENDAR A | | OPERATING DAY CALENDAR B | |
|---|---|---|---|---|---|
| | | OPERATING DAY ADDRESS | OPERATING DATE / CALENDAR DAY ADDRESS | OPERATING DAY ADDRESS | OPERATING DATE / CALENDAR DAY ADDRESS |
| 1 | 19940101 | 0 | 19940104 / 4 | 0 | 19940105 / 5 |
| 2 | 19940102 | 0 | 19940105 / 5 | 0 | 19940110 / 10 |
| 3 | 19940103 | 0 | 19940106 / 6 | 0 | 19940111 / 11 |
| 4 | 19940104 | 1 | 19940107 / 7 | 0 | 19940112 / 12 |
| 5 | 19940105 | 2 | 19940110 / 10 | 1 | 19940113 / 13 |
| 6 | 19940106 | 3 | 19940111 / 11 | 1 | 19940114 / 14 |
| 7 | 19940107 | 4 | 19940112 / 12 | 1 | 19940117 / 17 |
| 8 | 19940108 | 4 | 19940113 / 13 | 1 | 19940118 / 18 |
| 9 | 19940109 | 4 | 19940114 / 14 | 2 | 19940119 / 19 |
| 10 | 19940110 | 5 | 19940117 / 17 | 2 | 19940120 / 20 |
| 11 | 19940111 | 6 | 19940118 / 18 | 3 | 19940121 / 21 |
| . | . | . | . | . | . |
| 778 | . | . | | | |
| 779 | . | . | | | |
| . | . | . | | | |
| 1093 | 19961228 | 778 | | | |
| 1094 | 19961229 | 779 | | | |
| 1095 | 19961230 | 779 | | | |
| 1096 | 19961231 | 779 | | | |

FIG. 16

| RELATIVE POSITION (55) | LLC (56) | PART NUMBER (57) | EXPLOSION TYPE (58) | GROUP KEY (59) | REQUIRED DATE (60) | DATA AREA (53) | MAIN TABLE ADDRESS |
|---|---|---|---|---|---|---|---|
| | | | | | | | ENTRY POINT = 2501 (62) |
| | | MAIN TABLE (51) | | | | | SUB TABLE (52) |
| | | KEY AREA | | | | | (61) |
| 1 | XXXX | | | | | dddd | 1 |
| 2 | XXXX | | | | | dddd | 2 |
| | | | | | | | |
| 2485 | XXXX | | | | | dddd | 2485 |
| 2486 | XXXX | | | | | dddd | 2486 |
| 2487 | XXXX | | | | | dddd | 2487 |
| 2488 | XXXX | | | | | dddd | 2488 |
| 2489 | XXXX | | | | | dddd | 2489 |
| 2490 | XXXX | | | | | dddd | 2490 |
| 2491 | XXXX | | | | | dddd | 2491 |
| 2492 | XXXX | | | | | dddd | 2492 |
| 2493 | XXXX | | | | | dddd | 2493 |
| 2494 | XXXX | | | | | dddd | 2494 |
| 2495 | XXXX | | | | | dddd | 2495 |
| 2496 | XXXX | | | | | dddd | 2496 |
| 2497 | XXXX | | | | | dddd | 2497 |
| 2498 | XXXX | | | | | dddd | 2498 |
| 2499 | XXXX | | | | | dddd | 2499 |
| 2500 | XXXX | | | | | dddd | 2500 |
| 2501 | high | | | | | | 2501 |
| 2502 | high | | | | | | 2502 |
| 2503 | high | | | | | | 2503 |
| 2504 | high | | | | | | 2504 |

FIG. 17

| | MAIN TABLE | | | | | SUB TABLE |
|---|---|---|---|---|---|---|
| | KEY AREA | | | | DATA AREA | ENTRY POINT = 2498 |
| RELA-TIVE POSI-TION | LLC | PART NUMBER | EXPLO-SION TYPE | GROUP KEY | REQUIRED DATE | ............ | MAIN TABLE ADDRESS |
| 1 | XXXX | | | | | dddd | 1 |
| 2 | XXXX | | | | | dddd | 2 |
| | | | | | | | |
| 2485 | XXXX | | | | | dddd | 2485 |
| 2486 | XXXX | | | | | dddd | 2486 |
| 2487 | XXXX | | | | | dddd | 2487 |
| 2488 | high | | | | | | 2488 |
| 2489 | XXXX | | | | | dddd | 2489 |
| 2490 | XXXX | | | | | dddd | 2490 |
| 2491 | XXXX | | | | | dddd | 2491 |
| 2492 | high | | | | | | 2492 |
| 2493 | XXXX | | | | | dddd | 2493 |
| 2494 | XXXX | | | | | dddd | 2494 |
| 2495 | XXXX | | | | | dddd | 2495 |
| 2496 | high | | | | | | 2496 |
| 2497 | XXXX | | | | | dddd | 2497 |
| 2498 | XXXX | | | | | dddd | 2492 |
| 2499 | XXXX | | | | | dddd | 2496 |
| 2500 | XXXX | | | | | dddd | 2488 |
| 2501 | high | | | | | | 2501 |
| 2502 | high | | | | | | 2502 |
| 2503 | high | | | | | | 2503 |
| 2504 | high | | | | | | 2504 |

| COMPONENT PART NUMBER | PARENT PART NUMBER | QUANTITY PER ASSEMBLY | LEAD TIME |
|---|---|---|---|
| a | X | 1 | 5 |
| b | X | 1 | 5 |
| c | X | 1 | 5 |
| x | X | 1 | 9 |
| a | Y | 1 | 5 |
| b | Y | 1 | 5 |
| c | Y | 1 | 5 |
| d | Y | 1 | 5 |

FIG. 20

ENTRY POINT = 9

| SUB TABLE |
| --- |
| MAIN TABLE ADDRESS |
| 1 |
| 2 |
| 3 |
| 4 |
| 5 |
| 6 |
| 7 |
| 8 |
| 9 |

MAIN TABLE

| RELATIVE POSITION | LLC | KEY AREA ||| DATA AREA |
| --- | --- | --- | --- | --- | --- |
| | | PART NUMBER | EXPLOSION TYPE | GROUP KEY | REQUIRED DATE |
| 1 | 2 | a | | | 0805 | ......... |
| 2 | 2 | b | | | 0805 | dddd |
| 3 | 2 | c | | | 0805 | dddd |
| 4 | 3 | x | | | 0801 | dddd |
| 5 | 2 | a | | | 0905 | dddd |
| 6 | 2 | b | | | 0905 | dddd |
| 7 | 2 | c | | | 0905 | dddd |
| 8 | 2 | d | | | 0905 | dddd |
| 9 | | | | | | |

FIG. 21

| | MAIN TABLE | | | | | SUB TABLE |
|---|---|---|---|---|---|---|
| | KEY AREA | | | | DATA AREA | ENTRY POINT = 9 |
| RELA-TIVE POSI-TION | LLC | PART NUMBER | EXPLO-SION TYPE | GROUP KEY | REQUIRED DATE | | MAIN TABLE ADDRESS |
| | | | | | | ......... | |
| 1 | 2 | a | | | 0805 | dddd | 1 |
| 2 | 2 | a | | | 0905 | dddd | 2 |
| 3 | 2 | b | | | 0905 | dddd | 3 |
| 4 | 2 | d | | | 0905 | dddd | 4 |
| 5 | 2 | b | | | 0805 | dddd | 5 |
| 6 | 2 | c | | | 0805 | dddd | 6 |
| 7 | 2 | c | | | 0905 | dddd | 7 |
| 8 | 3 | x | | | 0801 | | 8 |
| 9 | | | | | | | 9 |

FIG. 22

| | MAIN TABLE | | | | | | ENTRY POINT = 8 SUB TABLE |
|---|---|---|---|---|---|---|---|
| RELATIVE POSITION | KEY AREA | | | | | DATA AREA | MAIN TABLE ADDRESS |
| | LLC | PART NUMBER | EXPLOSION TYPE | GROUP KEY | REQUIRED DATE | | |
| 1 | 2 | a | | | 0905 | ......... | 1 |
| 2 | 2 | b | | | 0805 | dddd | 2 |
| 3 | 2 | b | | | 0905 | dddd | 3 |
| 4 | 2 | d | | | 0905 | dddd | 4 |
| 5 | HIGH VALUE | | | | | dddd | 5 |
| 6 | 2 | c | | | 0805 | dddd | 6 |
| 7 | 2 | c | | | 0905 | dddd | 7 |
| 8 | 3 | x | | | 0801 | dddd | 5 |
| 9 | | | | | | | 9 |

LEVEL-BY-LEVEL EXPLOSION METHOD FOR MATERIAL REQUIREMENTS PLANNING

BACKGROUND OF THE INVENTION

1. Field of the Invention

This invention relates to a level-by-level explosion method for material requirements planning (MRP), and more particularly to a level-by-level explosion method for material requirements planning wherein a bill of material is produced in advance from a requirements plan for final goods and pieces of demand information which are produced for individual parts on the bill of material are registered in order of low level codes of the bill of material into a management table, and ordering processing is performed to extract necessary pieces of demand information from the management table and determine required date, required quantities and so forth of materials.

2. Prior Art

Conventional level-by-level explosion methods for material requirements planning of the type mentioned include "Parts List Preparation Control System" disclosed in Japanese Patent Laid-Open Application No. 200950/88 and "Calculation Device For Work Term" disclosed in Japanese Patent Laid-Open Application No. 041164/92 as well as "Arrangement Program Support System" which employs a high speed MRP technique disclosed in Japanese Patent Laid-Open Application No. 287357/91 and "Required Quantity Developing System" which makes use of a heap sorting system disclosed in Japanese Patent Laid-Open Application No. 094326/91.

An outline of several conventional examples is described below with reference to the drawings.

FIG. 1 shows a conventional example of a material information table used to construct a bill of material. The material information table shown in FIG. 1 includes various pieces of information such as part numbers as well as part names, units of measure and quantities on hand which relate to parts.

FIG. 2 shows a conventional example of a product structure table used to construct a bill of material. The product structure table shown in FIG. 2 includes various pieces of information such as parent part numbers, component part numbers of the parent part numbers, and quantities per assembly and leadtime offsets which relate to individual one parental relations between the parent parts and the component parts.

Those material information table and production structure table are stored in a data base in a disk, and in order to perform one level explosion of a bill of material, the parent parts are retrieved from the product structure table and corresponding component parts are exploded on a memory.

The conventional material bill constructing method described above is disadvantageous in that, when calculation processing for required quantities of parts existing on the bill of material is performed level-by-level, a long period of time is required for the entire processing since, at a time when processing for parts at a lower level is started after processing for an upper level is completed, information of upper level parts for which the processing has been completed is written onto the disk and component parts to be processed next are retrieved from the product structure table in the disk by performing matching of key items such as the part number and the part type and extracted onto the memory.

Next, FIG. 3 is a block diagram showing a construction of a conventional example of a calendar calculation device. In the conventional example of a calendar calculation device, calendar calculation means 23 refers to calendar day table 3, operating day table 4 and calculation conditions 6 to perform a calendar calculation and outputs calculation result 7.

FIGS. 4(a) and 4(b) are diagrammatic views illustrating calendar day table 3 and operating day table 4, respectively. Calendar day table 3 includes calendar dates 9 sorted and registered in an ascending order and table positions 8 indicating to what numbers of calendar day table 3 calendar dates 9 correspond.

Table positions 8 correspond to summed up calendar days and are used in place of calendar dates 9 in processing which requires a high-speed calendar calculation.

Operating day table 4 includes operating dates 11 sorted and registered in an ascending order, and table positions 10 indicating to what numbers of operating day table 4 operating dates 11 correspond.

Calculation conditions 6 include two dates or one date and one leadtime. Where calculation conditions 6 include two dates, for example, a due date and a start date of an order, a leadtime between the two dates, that is, a leadtime between the start date and the due date of the order, is outputted as calculation result 7. On the other hand, where calculation conditions 6 include one date and one leadtime, for example, a start date of an order and a leadtime between the start time and a due date of the order, one date, that is, the due date of the order after the leadtime from the start date of the order, is outputted as calculation result 7.

In the conventional calendar calculation device, in order to calculate a due date or a start date of an order, calendar day table 3 and operating day table 4 are referred to and calendar date 9 of the thus given due date is converted into operating date 11, and then operating date 11 is time-shifted on the operating day base taking holidays and special operation days into consideration, whereafter operating date 11 thus shifted is converted back into calendar date 9.

For example, an example wherein a leadtime is subtracted from a summed up calendar date of a due date to obtain a summed up calendar date of a start date is described. It is presumed that the due date and the start date are both operating days and the leadtime is a leadtime on the operating day base.

When the value of the summed up date of a given due date is "11" and the leadtime is two days, table positions 8 in calendar day table 3 are retrieved first, and as a result, "19940111" which is the value of calendar date 9 which corresponds to "11" of table position 8 is found out. Then, operating dates 11 in operating day table 4 are retrieved, and as a result, "6" which is a value of table position 10 which corresponds to "19940111" of operating date 11 is found out. Then, in order to time-shift operating date 11 on the operating day base, the value "2" of the leadtime is subtracted from the value "6" to obtain the value "4". Further, table positions 10 in operating day table 4 are retrieved, and as a result, "19940107" which is the value of the operating date which corresponds to "4" of table position 10 is found out. Finally, calendar dates 9 in calendar day table 3 are retrieved, and as a result, "7" which is a value of for Material Requirements Planning table position 8 which corresponds to "19940107" of calendar date 9 is found out. In accordance with the procedure described above, "7" which is the value of the summed up calendar day of the start day is finally found out.

The conventional calendar calculation device described above is disadvantageous in that, since, each time a leadtime calculation is performed, conversion from a calendar date to an operating date, time shifting and conversion from an operating date to a calendar date are performed, a long processing time is required for the calendar calculation. This is particularly notable in planning which is directed to a plurality of production shops and involves a plurality of operating day calendars because the operating day calendars are different among the production shops.

Finally, a conventional example of a level-by-level explosion method for material requirements planning for planning material requirements using a bill of material or a leadtime obtained using the method described above is described.

FIG. 5 is a diagrammatic representation of a model of a bill of material for use for a conventional level-by-level explosion method for material requirements planning. Parts X and Y are parts having a low level code =1, that is, parts at the final goods level; parts A, B, C, D and E have another low level code =2; and parts a, b, c, d, e, f, g, h and i have a further low level code =3. Part X is constituted from mid level items A, B and C, and part Y is constituted from mid level items C, D and E and part a. Mid level item A is constituted from parts d and e; mid level item B from parts b and c; mid level item C from parts a and b; mid level item D from parts f and g; and mid level item E from parts a, h and i.

Where a master production schedule is planned for each of items X and Y, required quantities of lower level parts are calculated in accordance with the following procedure. First, from the order for item X, demands for mid level items A, B and C (when and by what amount they are required) are produced. Then, from the order for item Y, demands for mid level items C, D and E and part a are produced. After processing for the parts of the low level code =1 is completed, ordering processing for the mid level items of the low level code =2 is performed, and from the mid level items, explosion to lower parts is performed, that is, demands for the parts of the low level code =3 are produced. After completion of the processing for the mid level items of the low level code =2, ordering processing for the parts of the low level code =3 is performed finally. This is the so called level-by-level explosion. In this instance, since part a of the low level code =3 is a common part to part Y and mid level items C and E, demands for part a are produced after the ordering processing for item Y, after the ordering processing for mid level item C, and after the ordering processing for mid level item E.

FIG. 6 is a diagrammatic view of a demand file which is produced, in the conventional level-by-level explosion method for material requirements planning which employs the model of the bill of material shown in FIG. 5, on a disk of an external storage apparatus of a computer which executes the method. The demand file of FIG. 6 includes part numbers 25, parent part numbers 26, required dates 27, required quantities 28 and other demand information. Pieces of demand information for a certain part produced from a plurality of parent parts are written into the demand file in the order in which ordering processing for the parent parts has been performed. For example, demands for part a are written once into the demand file shown in FIG. 6 after ordering processing for parent parts Y, C and E of part a. Before the ordering processing for part a is started, the demand file is read into a memory of the computer and the demands originating from the plurality of parent parts are sorted using a required date or the like as a key to produce an order.

In the conventional level-by-level explosion method for material requirements planning described above, since pieces of demand information produced for individual parts are stored into a demand file in the order in which ordering processing of parent parts has been performed and is kept stored in this order in the demand file until ordering processing for the parts is started and then, upon starting of ordering processing, the pieces of demand information are read in and sorting processing is performed using a low level code, a part number, a required date or the like as a key, reading/writing times for the demand information and sorting processing time for the demand information are required upon ordering processing for each part. Consequently, the conventional level-by-level explosion method is disadvantageous in that a long processing time is required.

SUMMARY OF THE INVENTION

It is an object of the present invention to provide a method by which the processing time required for retrieval of component parts and for calculation of a due date and a start date of an order and a release term can be reduced remarkably and demand information produced by level-by-level explosion can be obtained efficiently in a short time in a condition in which it is sorted in accordance with a predetermined order.

In order to attain the object described above, according to the present invention, there is provided a level-by-level explosion method for material requirements planning, which comprises:

the first step of constructing a bill of material including material information including item numbers of individual parts at individual product structure levels constituting an object product as well as item names, units of measure, quantities on hand and so forth and product structure information representing product structure relationships among the parts;

the second step of producing a MRP calendar for performing calendar planning which indicates required dates for the individual parts of the material information in reference to a calendar day calendar and an operating day calendar for a production shop; and the third step of, first, setting up the management table of a predetermined form and registering pieces of demand information produced for individual items of parts in the first and second steps into the management table in a predetermined order and, next, extracting necessary demand information in accordance with order information by a predetermined procedure from the management table for outputting planned and released order information.

As an embodiment of the present invention, the first step includes the steps of:

reading, using a material information table which includes part numbers, information peculiar to the items including part names, units of measure and quantities on hand, and product structure addresses indicating the tops of component part groups of the items in a product structure table and the product structure table which includes information relating to individual one parental relations including parent part numbers, component part numbers and quantities of the component parts per one parent part assembly and leadtimes as well as addresses of the parent parts and the component parts of the material information table, necessary information into the material information table and registering the thus read in information as a temporary material information table, sorting the temporary material information table using the part number as a key, and reading necessary information into the product structure table and storing the thus read in information as a temporary product structure table;

sorting, in order to perform processing for relating the material information table and the product structure table with each other, the temporary product structure table using the component part number as a key, setting relative positions of the material information table to the component part addresses, sorting contents of the temporary product structure table using the parent part number as a first key and using the component part number as a second key, setting relative positions of the material information table to the parent part addresses of the temporary product structure table, and setting relative positions of the temporary product structure table in which the first pieces of product structure of component part groups of the item numbers are stored in the product structure addresses of the temporary material information table; and completing, at a point of time when the product structure addresses of the temporary material information table are set and the parent part addresses and the component part addresses of the temporary product structure table are set, the temporary material information table and the temporary product structure table as the material information table and the product structure table, respectively.

As another embodiment of the present invention, the second step includes the steps of:

referring to a calendar day table including calendar dates and an operating day calendar table including operating dates in which a production shop for which the planning is to be performed operates to successively set calendar dates and operating dates in a corresponding relationship in order of the date and set table positions which are common summed up days from the tops of the calendar dates and the operating dates, comparing the calendar dates and the operating dates with each other in order of the table position beginning with the top dates and setting, when a calendar date is equal to an operating date, the value of the table position corresponding to the operating date as an operating day address corresponding to the calendar date and also setting the value of the table position corresponding to the calendar date as a calendar day address corresponding to the operating date, but setting, when the calendar date is smaller than the operating date, the value of the operating day address at the immediately preceding table position as an operating day address, advancing the table position for the calendar dates by one and keeping the table position of the operating date as it is, and repeating the comparison to set operating day addresses and calendar day addresses for all of the table positions in a similar manner to construct a composite calendar table; and referring to the composite calendar table and calculation conditions including two dates or calculation conditions including one date and one leadtime to calculate a result of calculation including a leadtime or a result of calculation including one date, respectively.

As a further form of the present invention, the third step includes, using the management table which includes a key area in which pieces of demand information including part numbers for identification of items, low level codes indicating absolute levels of the items in the bill of material and required timings at which the items are required are registered at a plurality of positions arrayed in order as well as a data area in which other demand information is stored, a sub table in which, in an initial state thereof, values equal to order numbers are stored at a plurality of positions arrayed in order, and an entry point in which, in an initial state thereof, "the number of registered pieces of demand information +1" is written, the steps of:

in order to register new demand information into the level-by-level explosion management table;

(1) registering the demand information into the position of the key area at an order number of the value of the sub table at an order number indicated by the value of the entry point;

(2) setting the order number of the position of the key area into which the demand information is registered in the processing at (1) as j;

(3) setting, for j determined by the processing at (2) or (4), i to a value equal to an integral portion of j/2 with fractions omitted;

(4) comparing, for i and j determined by the processing at (3), contents I and J at the ith and jth positions of the key area in accordance with a predetermined order in magnitude, and, when I≦J, performing ending processing at (5), but when I>J, replacing the contents at the ith and jth positions of the key area with each other, setting j to an equal value to the value of i and repeating the processing beginning with (3) again; and (5) finally incrementing, as the ending processing, the value of the entry point by one and ending the registration operation; and in order to extract the demand information from the management table;

(1) first extracting the demand information which is contents at the first position of the key area;

(2) setting, after the processing at (1), i, j and k to initial values of 1, 2 and 3, respectively;

(3) comparing, for i, j and k set by the processing at (2), contents J and K at the jth and kth positions of the key area with each other in accordance with the predetermined order, and, when J<K, substituting the contents J at the jth position of the key area into the ith position and setting i to an equal value to that of j and then performing the processing at (4), but when J>K, substituting contents K at the kth position of the key area into the ith position and setting i to an equal value to that of k and then performing the processing at (4), but otherwise when J=K, writing into the ith position of the key area a code indicating that the ith position is empty and then performing ending processing at (5);

(4) setting, for i determined by the processing at (3), j to a value equal to 1×2 and setting k equal to a value of j+1, and repeating the processing at (3); and (5) finally writing, as the ending processing, into the ith position of the key area a code indicating that the ith position is empty, decrementing the value of the entry point by one and substituting i into the position of the sub table of the order number of the value of the entry point.

BRIEF DESCRIPTION OF THE DRAWINGS

FIG. 1 is a diagrammatic view showing a conventional example of a material information table used to construct a bill of material;

FIG. 2 is a diagrammatic view showing a conventional example of a product structure table used to construct a bill of material;

FIG. 4a is a diagrammatic view showing a calendar day table shown in FIG. 3;

FIG. 4b is a diagrammatic view showing an operating day table shown in FIG. 3;

FIG. 7 is a schematic diagrammatic view illustrating a general processing flow of an embodiment of a level-by-level explosion method for material requirements planning of the present invention;

FIG. 8a is a diagrammatic view showing a material information table in the present embodiment;

FIG. 8b is a diagrammatic view showing a product structure table in the present embodiment;

FIG. 12 is a diagrammatic view showing a composite calendar table shown in FIG. 11;

FIG. 15 is a diagrammatic view of a composite calendar table in another embodiment of the present invention;

FIG. 16 is a diagrammatic view illustrating a condition wherein 2,500 pieces of demand information are registered successively from an initial state of a level-by-level management table used in the present embodiment;

FIG. 17 is a similar view but illustrating another condition of the level-by-level management table used in the present embodiment wherein three pieces of information are extracted from the level-by-level management table in the condition illustrated in FIG. 16;

FIG. 20 is a diagrammatic view showing a level-by-level management table in which pieces of demand information of parts of the model of the bill of material shown in FIG. 18 are registered in order of production;

FIG. 21 is a similar view but showing the level-by-level management table in which demand information of parts of the model of the bill of material shown in FIG. 18 is registered; and FIG. 22 is a diagrammatic view showing the levelby-level management table in a condition wherein the first piece of demand information for part a is extracted from the level-by-level management table in the condition shown in FIG. 21.

DETAILED DESCRIPTION OF THE PREFERRED EMBODIMENTS

Embodiments of the present invention are described below with reference to the drawings.

FIG. 7 is a schematic diagrammatic view showing a general processing flow in an embodiment of a level-by-level explosion method for material requirements planning of the present invention.

First, material information including part numbers of individual parts constituting final goods as well as part names, units of measure, quantities on hand and so forth and product structure representing structure relationships among the parts are read from a disk into a memory to construct a bill of material (step Si).

Then, referring to a calendar of calendar days and a calendar of operating days for a production shop, a MRP calendar is produced for performing a calendar calculation in consideration of the operating days which indicates required dates for the individual parts in order to perform production planning for a reference master production schedule or a material requirements schedule (step S2).

In execution of the MRP at the last stage, using the thus produced bill of material and MRP calendar, released orders or a released demand are registered into a management table for the individual parts on the bill of material from a requirements schedule for the final goods, and necessary demand information is extracted from the management table for performing ordering processing to decide required timings, required quantities and so forth of the parts, whereafter planned and/or released order information and planned and/or released demand information are outputted (step S3).

Next, the individual steps in the present embodiment are described in more detail with reference to the drawings.

First, the material bill constructing method at step S1 is described in detail.

Figure 3:
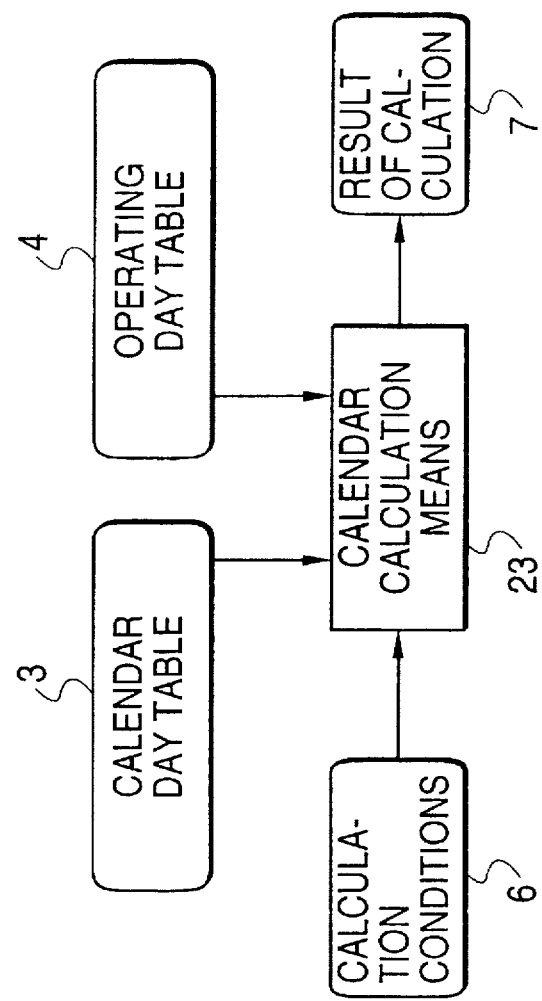
FIG. 3 is a block diagram showing a construction of a conventional calendar calculation device.
Figures 5, 6:
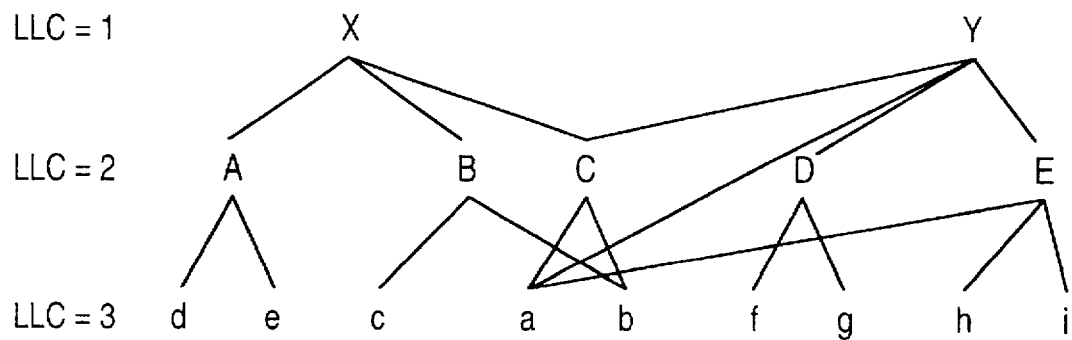
FIG. 5 is a diagrammatic representation of an example of a model of a bill of material to which a conventional level-by-level explosion method for material requirements planning is directed.
FIG. 6 is a diagrammatic view showing an example of a demand file which is used in a conventional level-by-level explosion for material requirements planning.
Figure 9:
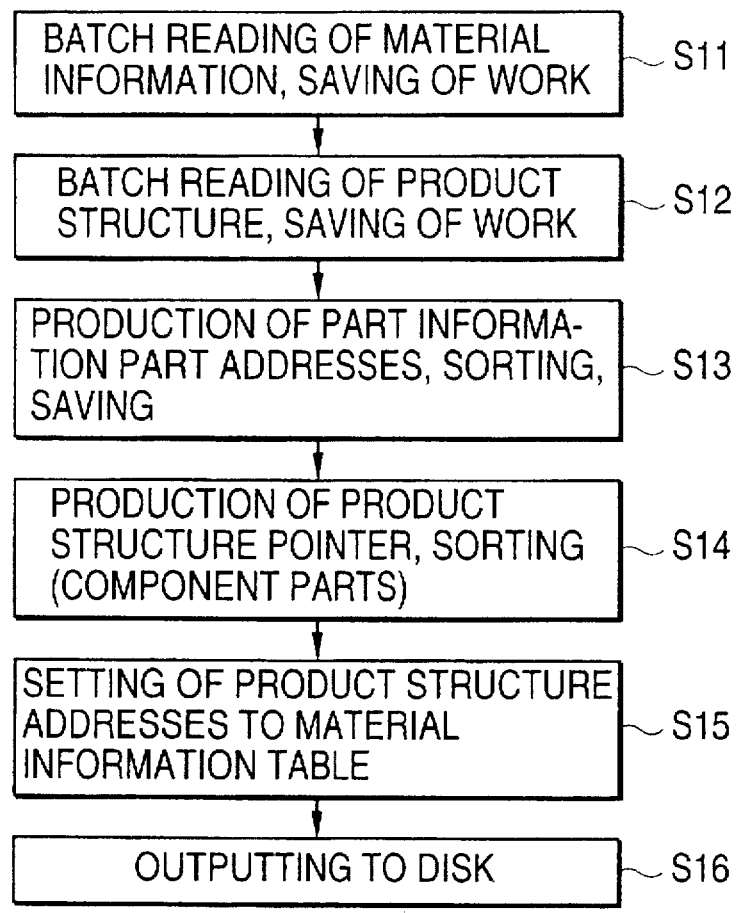
FIG. 9 is a flow chart illustrating construction of a bill of material in the present embodiment.

FIG. 8(a) shows a material information table used in the present embodiment, and FIG. 8(b) shows a product structure table used in the present embodiment. The material information table shown in FIG. 8(a) includes part numbers 31, various information relating to the parts, and product structure addresses 32 indicating the tops of component part groups of the parts of the product structure table. The product structure table shown in FIG. 8(b) includes parent part numbers 34, component part numbers 35, various information relating to individual one parental relations, addresses 36 of the parent parts and addresses 37 of the component parts of the material information table shown in FIG. 8(a). A system for constructing the material information table shown in FIG. 8(a) and the product structure table shown in FIG. 8(b) is described below with reference to the flow chart for construction of a bill of material shown in FIG. 9.

For the material information table, necessary information is read out from the disk into the memory and stored as a temporary material information table, and then sorted using part number 31 as a key (S11). Then, for the product structure table, necessary information is read out from the disk into the memory and stored as a temporary product structure table (S12). Thereafter, processing for relating the material information table and the product structure table with each other is performed.

In order to relate the material information and the product structure with each other, the temporary product structure table is first sorted with component part number 35, and relative positions 33 of the material information table are set to component part addresses 37 (S13). Then, the records of the temporary product structure table are sorted using parent part number 34 as a first key and using component part number 35 as a second key, and relative positions 33 of the material information table are set to parent part addresses 36 of the temporary product structure table (S14). Finally, relative positions 38 of the temporary product structure table at which the first pieces of product structure of the component part groups of part numbers 31 are stored are set to product structure addresses 32 of the temporary material information table (S15). At the point of time when the product structure addresses of the temporary material information table are set and the parent part addresses and the component part addresses of the temporary product structure table are set, the temporary material information table and the temporary product structure table are stored as a material information table and a product structure table, respectively, into the disk (S16).

Figure 10:
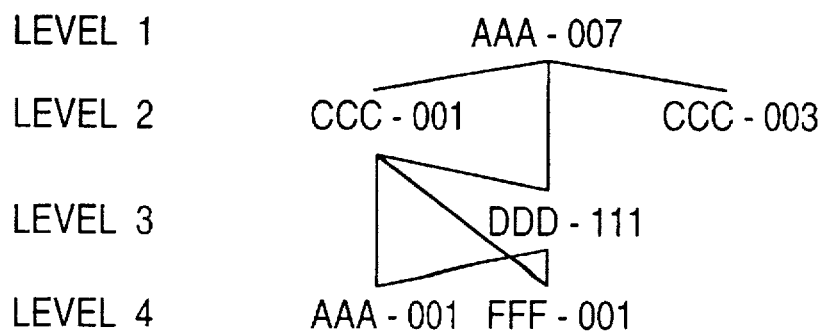
FIG. 10 is a diagrammatic representation showing an example of a tree of a bill of material in the present embodiment.

A tree of a bill of material shown in FIG. 10 is constructed from the material information table of FIG. 8(a) and the product structure table of FIG. 8(b). After processing for part number AAA-007 at the first level is completed, in order to perform processing for parts at a next level, the product structure address of part number AAA-007 in the material information table of FIG. 8(a) is referred to. Since the product structure address of part number AAA-007 is 0001, it can be seen that component parts of part number AAA-007 are parts within a range of the product structure table of FIG. 8(b) in which the parent part addresses are equal beginning with relative position 0001 and ending with relative position 0003, that is, CCC-001, CCC-003 and DDD-111. Thus, one level explosion of the bill of material is performed for the component parts listed above.

Next, production of a MRP calendar at step 2 is described in detail.

Figure 11:
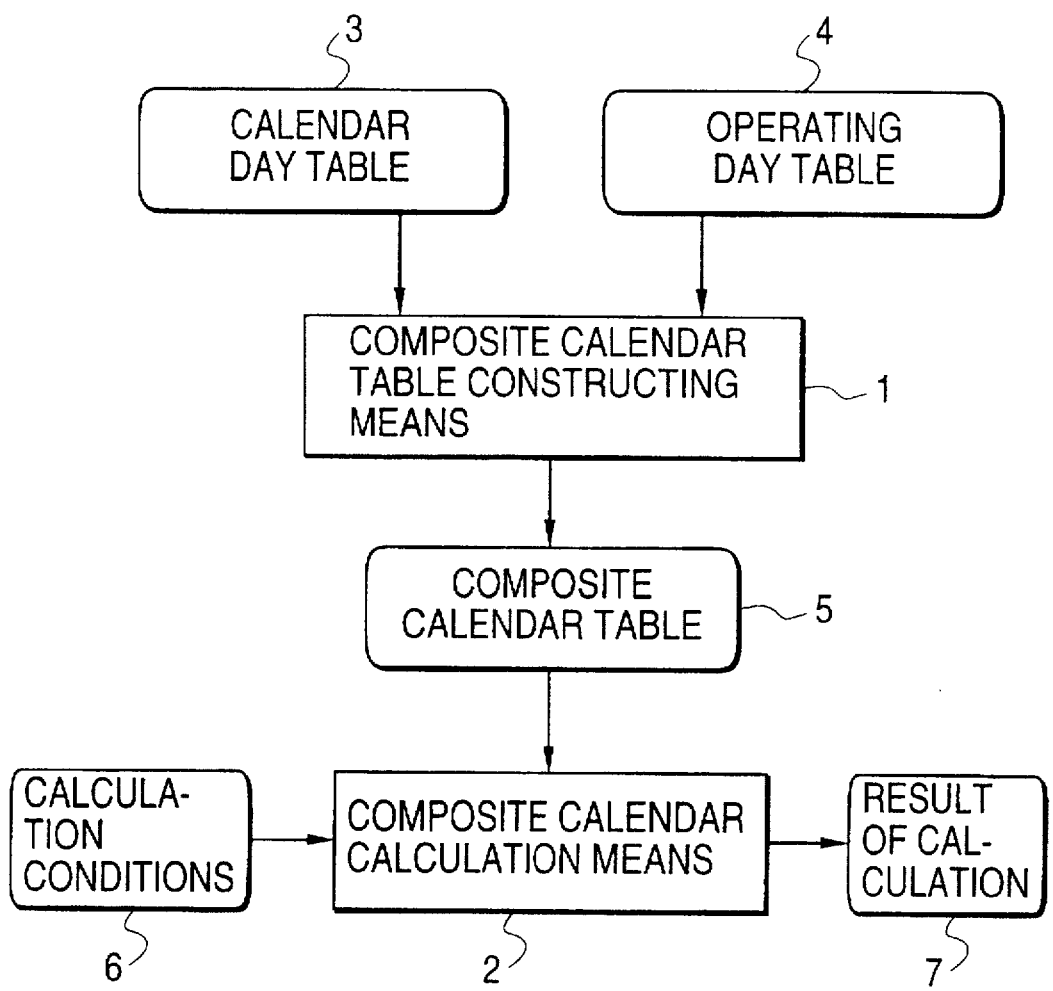
FIG. 11 is a block diagram showing a construction of a device which performs a calendar calculation in the present embodiment.

FIG. 11 is a block diagram showing a construction of a device which performs a calendar calculation in the present embodiment.

Composite calendar table constructing means 1 refers to calendar day table 3 and operating day table 4 to produce composite calendar table 5. Composite calendar calculation means 2 refers to composite calendar table 5 and calculation conditions 6 to perform a calendar calculation and outputs calculation result 7.

Figure 13:
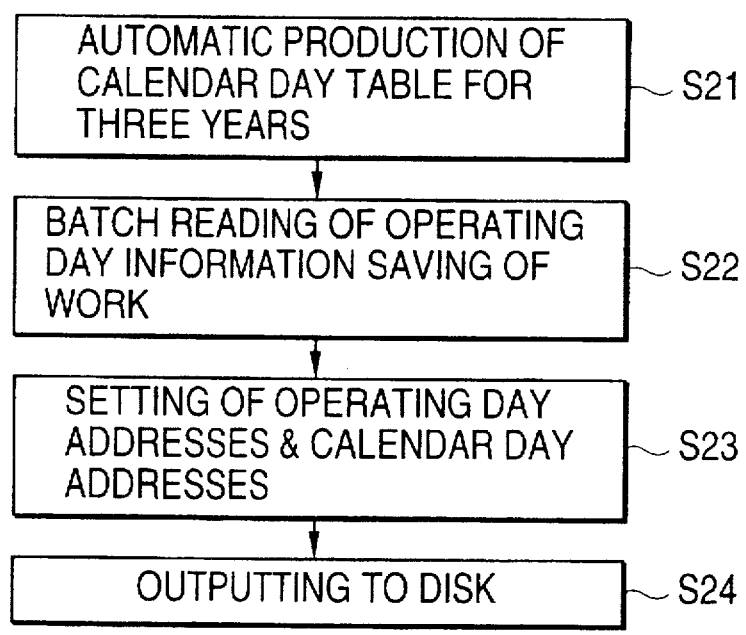
FIG. 13 is a flow chart illustrating processing for construction of the composite calendar table in the present embodiment.

FIG. 12 is a diagrammatic view illustrating composite calendar table 5 described above. Composite calendar table 5 includes table positions 12, calendar dates 13, operating day addresses 18, operating dates 15 and calendar day addresses 16. A flow of processing to construct the composite calendar table is described below with reference to FIG. 13.

Composite calendar table constructing means 1 reads in calendar dates 9 for an object period from calendar day table 3 shown in FIG. 4a, sorts calendar dates 9 in an ascending order, and successively sets them to calendar dates 13 of composite calendar table 5 (S21). Further, composite calendar table constructing means 1 reads in operating dates 11 from operating day table 5, sorts operating dates 11 in an ascending order and successively sets them to operating dates 15 of composite calendar table 5 (S22). Then, composite calendar table constructing means 1 sets operating day addresses 14 which indicate to what numbered days of operating dates 15 calendar dates 13 correspond and calendar day addresses 18 which indicate to which numbered days of calendar dates 13 operating dates 15 correspond (S23). Finally, the thus completed composite calendar table is stored onto the disk (S24).

Figure 14:
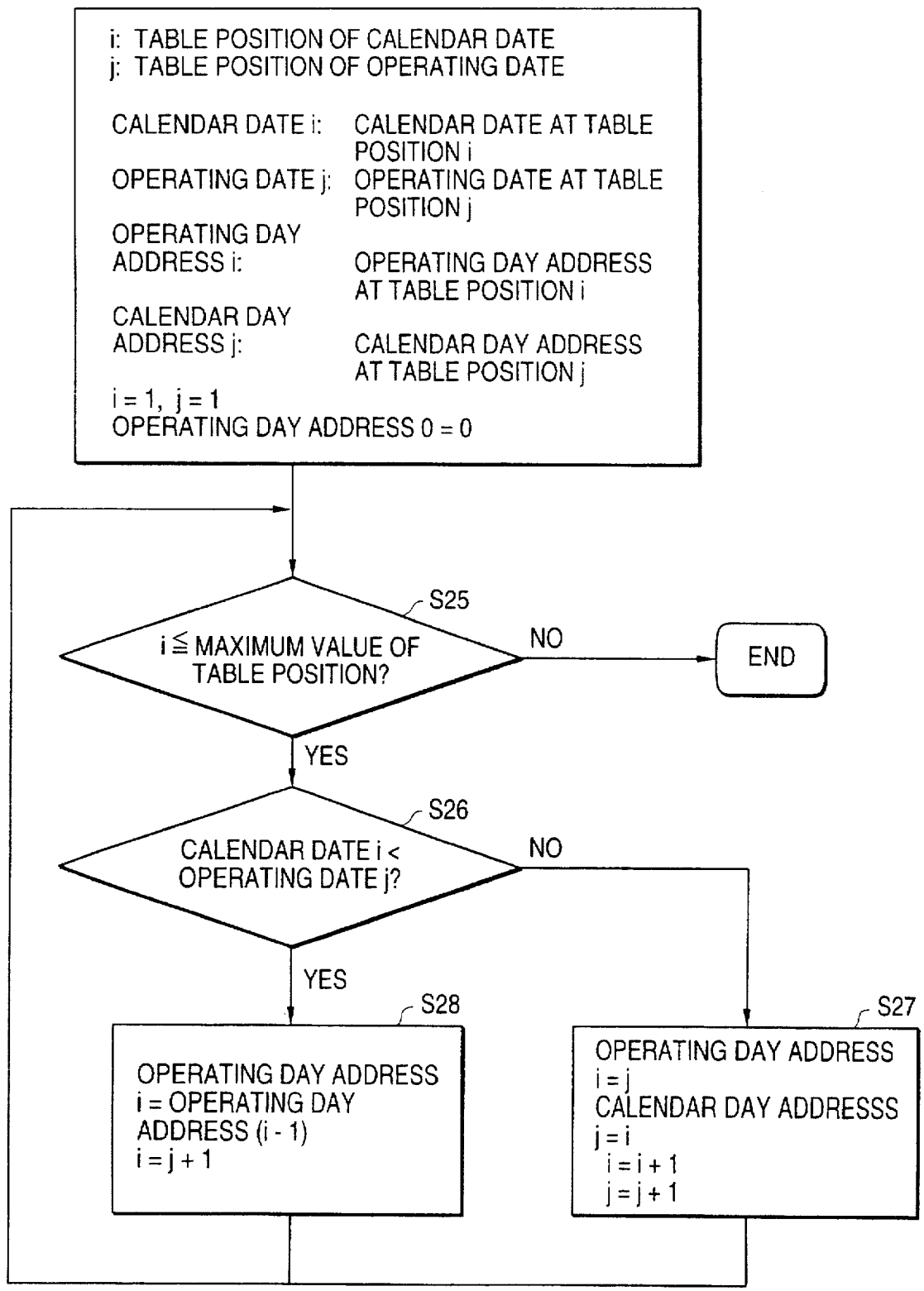
FIG. 14 is a flow chart illustrating setting operations for an operating day address and a calendar day address by composite calendar table constructing means shown in FIG. 11.

FIG. 14 is a flow chart illustrating the setting operation (S23) for operating day addresses 14 and calendar day addresses 18 by composite calendar table constructing means 1.

In the flow chart, one of the table positions of calendar dates 12 is represented by i and one of the table positions of operating date 15 is represented by j, and a date and an address are represented in the following manner.

calendar date i: calendar date at table position i
operating date j: operating date at table position j
operating day address i: operating day address at table position i
calendar day address j: calendar day address at table position j Thus, calendar date 13 and operating date 15 indicated by table position 12 are compared with each other. Table position 12 indicating calendar date 13 and table position 12 indicating operating date 15, which are objects for comparison, are both "1" at first. In short, comparison between calendar date 13 and operating date 15 is started beginning with the top of table positions 12.

First, it is checked whether or not table position i is lower than a maximum table position (S25), and if table position i is equal to or greater than the maximum table position, then the operation is ended, but if table position i is lower than the maximum table position, then calendar date i and operating date j are compared with each other (S26).

If calendar date i and operating date j are equal to each other, table position j corresponding to operating date j is set to operating day address i. Further, table position i of calendar date i is set to calendar day address j. Then, table position i of calendar date i and table position j of operating date j are both incremented by one (S27).

On the other hand, if calendar date i is smaller than operating date j, directly preceding operating day address (i-1) is set to operating day address i. However, when this condition occurs at the top of table positions 12, the value "0" is set to the operating day address. Then, table position i of calendar date i is incremented by one. Table position j of operating date j is not varied (S28). Thereafter, the setting operations of operating day address 14 and calendar day address 16 are repeated again in this manner.

Next, a calculation operation of composite calendar calculation means 2 is described. An example wherein, for example, a leadtime is subtracted from a summed up calendar day of a due date to obtain a summed up calendar day of a start day. It is presumed that both of the due date and the start day are operating days and the leadtime is based on operating days.

When the value of the summed up calendar days of a given due date is "11" and the leadtime is two days, table positions 12 in composite calendar table 5 are first retrieved, and as a result, "6" which is the value of operating day address 14 which corresponds to "11" of table position 12 is found out. Then, in order to time shift the operating day address based on operating days, the value "2" of the leadtime is subtracted from the value "6" to obtain the value "4". Finally, operating day addresses 14 are retrieved, and as a result, table position 12 corresponding to "4" of operating day address 14 is found out. Where another equal value or values are present in operating day addresses 14, table position 12 which has a minimum value is found out. In the present example, the value of table position 12 thus found out is "7". In accordance with the procedure described above, the value of the summed up calendar days of the start day is finally determined to be "7".

FIG. 15 is a diagrammatic view illustrating composite calendar table 5 used in another embodiment of the present invention. While composite calendar table 5 shown in FIG. 12 involves a single production shop, composite calendar table 5 shown in FIG. 15 involves a plurality of production shops some of which have different operating day calendars. Table positions 12 and calendar dates 13 are common among the production shops. In operating day calendar A, operating day addresses 14, operating dates 15 and calendar day addresses 18 are described, and in operating day calendar B, operating day addresses 44, operating dates 45 and calendar day addresses 48 are described. Also in this instance, composite calendar table constructing means 1 successively refers to operating date calendar tables 4 of the shops to produce composite calendar table 5 shown in FIG. 15 using the method described above.

A calendar calculation for planning of or modification to a schedule directed to a plurality of production shops having different operating day calendars is performed in the following manner using composite calendar table 5 shown in FIG. 15. A calculation of a summed up calendar date of a start day in the case wherein, for example, the value of a summed up calendar days of a given due date is "11" and the leadtime is two days is described. By composite calendar calculation means 2, the value "7" of table position 12 which is a summed up calendar day of the start day is calculated for the production shop or shops which have operating day calendar A, and the value "5" of table position 12 which is a summed up calendar day of the start day is calculated for the production shop or shops which have operating day calendar B. Those summed up calendar days of the start days are calculated simultaneously referring to composite calendar table 5.

Finally, the level-by-level explosion method for MRP at step 3 is described in detail.

FIG. 16 is a diagrammatic view of a level-by-level management table used in the present embodiment. Ordering processing including calculations of required quantities of individual parts is performed such that, for each part, required quantities of parts constituting the part are calculated as demand information together with required dates and so forth calculated at step 2 in accordance with a low level code indicating a level on the bill of material produced at step 1, and after this is performed for all upper parts, the pieces of demand information are extracted in a predetermined order defined by the low level code, the part number or the like. Accordingly, for a time until pieces of demand information which are produced for individual upper parts at the individual levels become an object for ordering processing of each part, they must be stored with certainty on the memory and must be held in a condition wherein they can be sorted with a key item such as a low level code, a part number, an explosion type, a group key, a required date or the like. This is realized on the memory by the level-by-level management table. In order to perform ordering processing for a certain part, corresponding pieces of demand information are extracted from the level-by-level management table into an ordering table.

The level-by-level management table shown in FIG. 16 is in a condition wherein 2,500 pieces of demand information have been successively registered from an initial state. The level-by-level management table is constituted from main table 51 in which demand information is physically stored, and sub table 52 which is an area for controlling an entry point of main table 51. Main table 51 includes key area 53 for storing key information of demand information produced with a part and data area 54 for demand information. Key area 53 includes key items of relative positions 55 indicating the positions of data in the main table, low level codes 56 of parts, part numbers 57 indicating addresses of the material information table, explosion types 58 indicating whether or not explosion to lower parts should be performed, group keys 59 indicating pegging order numbers, and required dates 60 indicating dates on which parts are needed. Data area 54 includes other demand information such as required quantities, released quantities and demand status.

Sub table 52 stores main table addresses 61 indicating relative positions of main table 51 into which demand information is to be registered. In an initial state, relative positions of main table 51 are stored in corresponding main table addresses 61 as seen in FIG. 16. Entry point 62 indicates a relative position of main table addresses 61 in sub table 52, and main table address 61 indicated by entry point 62 indicates relative position 55 of main table 51 into which demand information is to be registered next. When the contents of entry point 62 are n, a value stored in the nth address of sub table 52 is a relative position of main table 51 into which demand information is to be stored.

In the case shown in FIG. 16, in the condition wherein 2,500 pieces of demand information are successively registered from the initial state, entry point 62 indicates 2,501 and also 2,501st main address 61 indicates 2,501, and the next position for registration is the position where relative position 55 of main table 51 is 2,501.

FIG. 17 shows a diagrammatic view of the level-by-level management table in a condition wherein pieces of demand information at the 2,488th, 2,496th and 2,492nd relative positions of main table 51 are successively extracted and delivered to an ordering table (not shown) provided separately on the memory. When the three pieces of information are delivered, since the contents of entry pointer 62 are 2,498 as a result of subtraction which will be hereinafter described, the position for registration of a next piece of demand information is the 2,498th value of sub table 52 and is, in the example of FIG. 17, the 2,492nd position of main table 51. Thereafter, replacement is performed in accordance with a predetermined procedure based on contents of key area 53 of the demand information, and then the value of entry point 62 is incremented by one to 2,499.

A method of registering demand information produced from parent parts on the final goods level in the present embodiment proceeds in the following procedure. It is to be noted that, in the present embodiment, contents of key area 53 (except relative positions 55) at relative positions 55 of main table 51 which are i, j and k are represented by I, J and K, respectively. In order to sort key area 53, the relationship in magnitude of contents of key area 53 are determined in advance for each key item such that the relationship in magnitude of low level codes 56 is determined in accordance with the values of them; the relationship in magnitude of part numbers 57 among a, b, c, ... shown in FIG. 20 and so forth is determined such that the later value in the alphabetical order has a higher value; and the relationship in magnitude of required dates 60 is determined such that the value earlier in time has a lower value, and then the relationship in magnitude is determined giving priority to a left side one of the items in the table shown in FIG. 16.

(1) First, demand information to be registered is set to a relative position of main table 51 which is equal to contents of a position of sub table 52 of an order number of a value indicated by entry pointer 62.

(2) Relative position 55 of main table 51 into which demand information has been registered is represented by j.

(3) i=j/2 (fractions omitted) is calculated to obtain i.

(4) Contents I and J in key area 53 at ith and jth relative positions 55 are compared with each other, and when I≦J, ending processing at (5) is performed, but when I>J, contents of key area 53 and data area 54 at the ith and jth positions of main table 51 are replaced with each other, and j is set to j=i, whereafter the processing at (3) is performed again.

(5) Finally, as the ending processing, the value of entry point 62 is incremented by one. It is to be noted the initial value of entry point 62 is 1.

If registration of demand information into the level-by-level management table is performed in accordance with the procedure described above, when the relationship of ith, jth and kth relative positions 55 of main table 51 is determined such as the jth position =ith position × 2 and the kth position =jth position +1, the relationship in magnitude among contents I, J and K of key area 3 at ith, jth and kth relative positions 55 is I≦J and I≦K without fail. By extracting demand information in the following procedure from the level-by-level management table which is in such a condition as described above, pieces of demand information can be obtained in an order sorted in accordance with the contents of key area 53.

The method of extracting the demand information registered in the level-by-level management table proceeds in the following procedure.

(1) Since information where the contents of key area 53 are minimum is always present at the first position of key area 53 of main table 51, demand information of key area 53 and data area 54 at the first position is extracted first.

(2) Initial values of i=1, j=2 and k=3 are set.

(3) Contents J and K of key area 53 at the jth and kth positions are compared with each other, and when J<K, jth contents of key area 53 and data area 54 are substituted into the ith positions to establish i=j, and then processing at (4) is performed. When J>K, kth contents of key area 53 and data area 54 are substituted into the ith positions to establish i=k, and then processing at (4) is performed. When J=K, J=high value processing (a code indicating that the address is empty is written into the jth position of key area 53 except relative position 55) is performed, and ending processing at (5) is performed.

(5) "high value" is substituted into the ith position of key area 53. The contents of entry point 62 are decremented by one, and then the value of i is substituted into the position of an order number of a value indicated by entry point 62 of sub table 52.

Figures 18, 19:
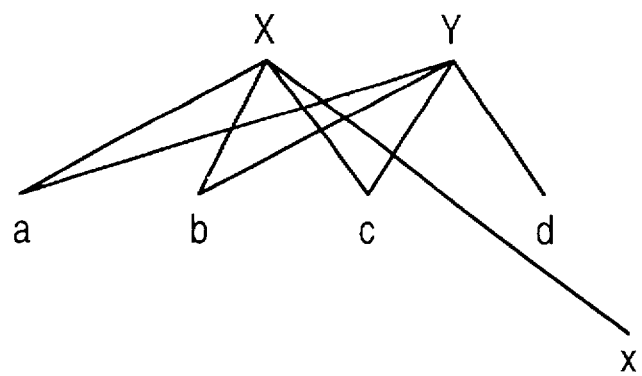
FIG. 18 is a diagrammatic representation of an example of a model of a bill of material to which the present embodiment is directed.
FIG. 19 is a diagrammatic view of a product structure table of the model of the bill of material shown in FIG. 18.

FIG. 18 is a diagrammatic view of a model of a bill of material for concretely explaining the registration method of demand information into the level-by-level management table of the present embodiment and the extraction method of demand information. Meanwhile, FIG. 19 is a diagrammatic view showing a product structure table in which parent part numbers, quantities per assembly and leadtimes of individual component parts of the model of the bill of material shown in FIG. 18. It is assumed that an order on August 10 is provided for part X of the low level code=1 on the bill of material and an order on September 10 is provided for part Y.

FIG. 20 is a diagrammatic view showing the level-by-level management table when pieces of demand information produced from part X and part Y are not registered in accordance with the registration method described above but registered simply in order of production in order to explain the registration method. First, from the order for part X, demands for component parts a, b, c and x are produced in this order, and the pieces of demand information are registered sequentially to the first to fourth positions of the key area and the data area of the level-by-level management table. In this instance, the value of the entry point is 5. Further, required dates of the demands for the component parts are obtained by time shifting from the date of the order for part X by the leadtime of the product structure table shown in FIG. 19 (it is assumed that no non-operating day is included in the period).

Then, demands for component parts a, b, c and d are produced form the order for part Y. First, the demand information for component part a is registered into the fifth positions of the key area and the data area of the level-by-level management table. Then, in accordance with the processing at (2) of the registration method of demand information described above, j is set to 5, and then in accordance with the processing at (3) of the registration method, i is set to 2. Thereafter, in accordance with the processing at (4) of the registration method, contents J of the key area of the information registered in the jth position, that is, the fifth position, of the key area (LLC (low level code)=2, part number=a, and required date=September 5) and contents I of the key area of the information stored in the ith position, that is, the second position of the key area (LLC=2, part number= b, and required date=August 5) are compared with each other. Since I>J, the contents in the ith and jth positions of the key area and the data area are replaced with each other, and j is set to i, whereafter the processing at (3) is performed again. After returning to the processing at (3), j and i become 2 and 1, respectively, and then in the processing at (4), contents J of the key area in the jth position, that is, the second position (LLC=2, part number=a, and required date= September 5) and contents I of the key area in the ith position, that is, the first position (LLC=2, part number=a, and required date=August 5) are compared with each other. Since I<J, the processing at (4) is ended, and the value of the entry point is incremented by one to 6 in accordance with the processing at (5) of the registration method. Then, the pieces of demand information of component part b are registered as sixth pieces of information of the key area and the data area, and contents of the key area and the data area in the sixth and third positions are replaced with each other in accordance with a similar method to that described above. Thereafter, the pieces of demand information of component part c are registered as seventh pieces of information of the key area and the data area. In this instance, j and i are set to 7 and 3, respectively, and even if contents J of the key area of the information in the jth position, that is, the seventh position and contents I of the key area of the invention in the ith position, that is, the third position are compared with each other, since I<J, no replacement is performed. Finally, the demand information of component part d is registered into the 8th positions. In this instance, the contents in the eighth position are replaced with the contents in the fourth position.

FIG. 21 is a diagrammatic view showing the level-by-level management table in a condition immediately before ordering processing for parts of the low level code=2 is started after demand information has been registered in such a manner as described above. The method of extracting demand information from the level-by-level management table in order to perform ordering processing for part a is described in detail below. First, in accordance with the processing at (1) of the extraction method of demand information described above, the pieces of demand information in the first positions of the key area and the data area are extracted, and then in accordance with the processing at (2) of the extraction method, i, j and k are set to i=1, j=2, k=3, respectively. Then, in accordance with the processing at (3) of the extraction method, contents J of the key area of the demand information in the jth position, that is, the second position (LLC=2, part number=a, and required date= September 5) and contents K of the key area of the kth, that is, third, pieces of demand information (LLC=2, part number=b, and required date=September 5) are compared with each other. Since J<K, the second pieces of demand information are brought to the first positions. Then, in accordance with the processing at (4) of the extraction method, j is set to i×2, that is, 2×2=4, and k is set to j+1, that is, 4+1=5, and then the processing at (3) of the extraction method is performed again. Here, contents J of the key area of the jth, that is, fourth pieces of demand information (LLC=2, part number=d, and required date=September 5) and contents K of the key area of the kth, that is, fifth pieces of demand information.. are compared with each other. Since J>K, the fifth pieces of demand information are brought to the second positions. In accordance with the processing at (4) of the extraction method again, j is set to i×2, that is, 5×2=10 and k is set to j+1, that is, 10+1=11. In this instance, since no values are registered in the 10th and 11th positions of the key area, contents J and K of jth and kth, that is, the 10th and 11th pieces of demand information are set to table max, and then the processing at (3) is performed again. Here, since J=K=table max, the ending processing at (5) of the extraction method is performed with J=high value. In this instance, since i=5, contents of the key area in the fifth positions are set to high value, and the value of the entry point is varied to 9−1=8 and 5 is placed into the eighth position of the sub table.

FIG. 22 is a diagrammatic view showing the level-by-level management table in a condition immediately after the demand information of part a has been extracted in accordance with the method described above. Then, demand information of part a is extracted in the following manner. As the processing at step (3) after the processing at (1) and (2) of the extraction method has been performed, contents J of the key area in the jth, that is, second position (LLC=2, part number =b, and required date=August 5) and contents K of the key area in the kth, that is, third position (LLC=2, part number=b, and required date=September 5) are compared with each other. Since J<K, the second pieces of demand information are brought to the first position. Next, in accordance with the processing at (4) of the extraction method, j is set to i×2, that is, 2×2=4 and k is set to j+1, that is, 4+1=5, and then the processing at (3) of the extraction method is performed again. Here, contents J of the key area of the jth, that is, fourth pieces of demand information (LLC=2, part number=d, and required date=September 5) and contents K (high value) of the key area of the kth, that is, fifth pieces of demand information are compared with each other. Since J<K, the fourth pieces of demand information are brought to the second position. In accordance with the processing at (4) of the extraction method again, j is set to i×2, that is, 4×2=8 and k is set to j+1, that is, 8+1=9. However, since no value is registered in the key area in the kth, that is, ninth position, contents J and K of the jth and kth pieces of demand information are set to table max, and then the processing at (3) is performed again. After returning to the processing at (3), contents J of the key area in the jth, that is, eighth position (LLC=3, part number=X, and required date=August 1) and table max of contents K of the key area in the kth, that is, ninth position are compared with each other. Since J<K, the eighth pieces of demand information are brought to the fourth position. In accordance with the processing at (4) of the extraction method once again, j is set to i×2, that is, 8×2=16 and k is set to j+1, that is, 16+1=17. However, since no value is present in the 16th and 17th positions, J and K are set to table max, and the processing at (3) is performed again. Thereafter, the ending processing at (5) of the extraction method is performed. In this instance, since i=8, the key area in the eighth position is set to high value, and the value of the entry point is changed to 8−1=7 and 8 is placed into the seventh position of the sub table.

Demand information of parts b, c, d and x are extracted in this order in such a manner as described above. It is to be noted that, according to the present invention, pieces of demand information can be sorted and extracted in an ascending order or a descending order or in any of various other orders from a level-by-level explosion management table.

As described above, since the level-by-level explosion method for material requirements planning of the present embodiment is constructed such that, upon construction of a bill of material, one level explosion of the bill of material is performed on demand by designating a component part by way of addresses including a product structure address provided in the material information table and a part address provided in the product structure table, there is an advantage in that the retrieval time for component parts can be reduced. On the other hand, upon calendar calculation, since a leadtime calculation is performed in terms of a value of an operating day address, there is no need of performing conversion from a calendar date to an operating date or conversion from an operating date to a calendar date. Consequently, there is another advantage in that the processing time for complicated processing can be reduced. Further, when demand information is registered into the level-by-level explosion management table and when the demand information is extracted from the level-by-level explosion management table, a predetermined processing procedure is employed such that contents at a plurality of positions of the key area in which the demand information of the level-by-level explosion management table is registered are replaced with each other. Consequently, there is a further advantage in that pieces of demand information produced by level-by-level explosion can be obtained efficiently in a short time in a condition wherein they are sorted in accordance with a predetermined order. Particularly, since a piece of information which comes to the top when a plurality of pieces of demand information registered in the level-by-level explosion management table are sorted in any predetermined order is always registered at the first position of the key area, the piece of demand information which comes to the top position by the sorting can be extracted immediately by a single accessing operation.

What is claimed is:

1. A level-by-level explosion method for managing the processing and timing of an order of required materials, said level-by-level explosion method comprising the steps of:

(a) inputting the order of required materials, wherein the required materials comprise parent parts and component parts;

(b) constructing a material information table and a product structure table, wherein the material information table and the product structure table relate the parent parts to the component parts;

(c) constructing a bill of material using the material information table and the product structure table;

(d) constructing a composite calendar table from a calendar day table and an operating day table;

(e) calculating a plurality of order dates using calculation conditions and the composite calendar;

(f) setting up a management table facilitating registration and extraction of order information using the bill of material and the plurality of order dates; and (g) outputting the order information, wherein the order information includes timing of the order.

2. The level-by-level explosion method of claim 1, wherein step (b) comprises the steps of:

reading material information into a temporary material table;

sorting the temporary material table using a generic part number category as a key;

reading product structure into a temporary product table;

sorting the temporary product table using a component part category as a key;

registering in the temporary product table, a location of the generic part number category in the temporary material table equivalent to the component part category in the temporary product table;

re-sorting the temporary product table using a parent part category as a first key and the component part category as a second key;

registering in the temporary product table a location, of the generic part number category in the temporary material table, equivalent to the parent part category in the temporary product table;

registering in the temporary material table a location, of the parent part category in the temporary product table, equivalent to the generic part number category in the temporary material table; and transferring the temporary material table to the material information table, and the temporary product table to the product structure table.

3. The level-by-level explosion method of claim 1, wherein step (d) comprises the steps of:

assigning a calendar day address to the operation day table and a operation day address to the calendar day table;

assigning a counter, i, to a first position in the calendar day table and a counter, j, to a first position in the operation day table, wherein the calendar day table has a maximum position;

beginning a loop;

assigning the operating day address at position i to i−1 and assigning i=j+1, when (1) i≦the maximum position and (2) the date of the calendar day table at position i<the date of the operation day table at position j;

assigning the operation day address at position i=j, assigning the calendar day address at position j=i, assigning i=i+1, and assigning j=j+1 when (1) i≦the maximum position and (2) the date of the calendar day table at position i>the date of the operation day table at position j;

returning to the beginning a loop unless i>the maximum position.

4. The level-by-level explosion method of claim 3, wherein the calculating conditions of step (e) comprise an order date, a leadtime, and a due date; and wherein step (e) comprises the steps of:

outputting a difference between two operating day addresses corresponding to the due date and the order date, when the due date and the order date of the order are given;

outputting the order date corresponding to the operating day address obtained by subtracting the leadtime from the operating day address corresponding to the due date, when the due date and the leadtime are given;

outputting the due date corresponding to the operating day address obtained by adding the leadtime to the operating day address corresponding to the start date, when a start date of an order and a leadtime are given.

5. The level-by-level explosion method of claim 1, wherein the composite calendar comprises a plurality of operating day calendars corresponding to a plurality of production shops; and wherein level-by-level explosion method calculates a plurality of order dates for the plurality of production shops.

6. The level-by-level explosion method of claim 1, wherein the management table of step (f) comprises at least an entry point value, and a key area; and wherein the registration of order information further comprises the steps of:

registering the order information into a position in the key area corresponding to the entry point value;

assigning a counter, j, to the position in the key area corresponding to the entry point value;

beginning a loop;

assigning a counter, i, equal to the integer value of j/2;

comparing a value of data in the key area at position i to a value of data in the key area at position j;

swapping the data in the key area at position i with the data in the key area at position j and assigning j=i, when the data in position i>the data in position j;

returning to the beginning a loop unless the data in position i≦the data in position j; and incrementing the entry point value by one.

7. The level-by-level explosion method of claim 1, wherein the management table of step (f) comprises at least an entry point value, a sub table, and a key area; and wherein the extraction of order information further comprises the steps of:

extracting the order information from a first position of the key area;

assigning a counter, i, to the first position of the key area, assigning a counter, j, to a second position of the key area, and assigning a counter, k, to a third position of the key area;

beginning a loop;

comparing a value of data in the key area at position j to a value of data in the key area at position k;

substituting the data in the key area at position j into the key area at position i and setting i=j, when the value at position j<the value at position k;

substituting the data in the key area at position k into the key area at position i and setting i=k, when the value at position j>the value at position k;

writing into the key area at position i an empty code when the value at position j=the value at position k;

assigning j=i*2 and k=j+1;

returning to the beginning of a loop unless j=k=a maximum value; and writing into position i of the key area a code indicating that position i is empty, decrementing the entry point value by one, and substituting i into a position of the sub table corresponding to the entry point value.

8. A level-by-level explosion method for material requirements planning for performing, upon material requirements planning, ordering processing to determine required timings, required quantities of required materials by extracting, from a management table, in which pieces of demand information produced for individual items of parts constituting final goods are registered in advance, necessary demand information in accordance with order information, the level-by-level explosion method comprising the steps of:

a first step of constructing a bill of material including material information including part numbers of individual parts at individual product structure levels constituting an object product as well as part names, units of measure, quantities on hand and product structure information representing product structure relationships among the parts;

a second step of, first, producing a composite calendar table for performing calendar planning which includes calendar dates and operating dates for a production shop, table positions which are common summed up days corresponding to the calendar dates and the operating dates, operating day addresses corresponding to the respective calendar dates and also indicating the table positions of the operating dates which are equal to the calendar dates, respectively, and calendar day addresses corresponding to the respective operating dates and also indicating the table positions of the calendar dates which are equal to the operating dates, and next, obtaining, using the composite calendar table, required dates for the individual parts of the material information; and a third step of, first, setting up the management table of a predetermined form and registering pieces of demand information produced for individual items of parts in the first and second steps into the management table in a predetermined order and, next, extracting necessary demand information in accordance with order information from the management table for outputting planned and released order information and demand information.

9. A level-by-level explosion method for material requirements planning as claimed in claim 8, wherein the first step includes the steps of:

first, reading, using a material information table which includes part numbers, information peculiar to the items including part names, units of measure and quantities on hand, and product structure addresses indicating the tops of component part groups of the items in a product structure table, and the product structure table which includes information relating to individual one parental relations including parent part numbers, component part numbers and component parts quantities per one parent parts assembly and leadtimes as well as addresses of the parent parts and the component parts of the material information table, necessary information into the material information table;

registering the thus read in information as a temporary material information table;

sorting the temporary material information table using the part number as a key;

reading necessary information into the product structure table and storing the thus read in information as a temporary product structure table; next, sorting, in order to perform processing for relating the material information table and the product structure table with each other, the temporary product structure table using the component part number as a key;

setting relative positions of the material information table to the component part addresses;

sorting contents of the temporary product structure table using the parent part number as a first key and using the component part number as a second key;

setting relative positions of the material information table to the parent part addresses of the temporary product structure table;

setting relative positions of the temporary product structure table in which the first pieces of product structure of component part groups of the part numbers are stored in the product structure addresses of the temporary material information table; and further, completing, at a point of time when the product structure addresses of the temporary material information table are set and the parent part addresses and the component part addresses of the temporary product structure table are set, the temporary material information table and the temporary product structure table as the material information table and the product structure table, respectively.

10. A level-by-level explosion method for material requirements planning as claimed in claim 8, wherein the second step includes the steps of:

first, referring to a calendar day table including calendar dates and an operating day table including operating dates in which a production shop for which the planning is to be performed operates to successively set calendar dates and operating dates in a corresponding relationship in order of the date;

setting table positions which are common summed up days from the tops of the calendar dates and the operating dates;

comparing the calendar dates and the operating dates with each other in order of the table position beginning with the top dates, and setting, when a calendar date is equal to an operating date, the value of the table position corresponding to the operating date as an operating day address corresponding to the calendar date and also setting the value of the table position corresponding to the calendar date as a calendar day address corresponding to the operating date, setting, when the calendar date is smaller than the operating date, the value of the operating day address at the immediately preceding table position as an operating day address;

advancing the table position for the calendar dates by one and keeping the table position of the operating date as it is, and repeating the comparison to set operating day addresses and calendar day addresses for all of the table positions in a similar manner to construct a composite calendar table; and calculating a result of calculation by referring to the composite calendar table, based on calculation conditions provided as follows:

(1) when a due date and a start date of an order are given, the result of calculation is the difference between two operating day addresses corresponding to the two dates, respectively, (2) when a due date of an order and a leadtime are given, the result of calculation is a start date of the order corresponding to the operating day address which is obtained by subtracting the leadtime from the operating day address corresponding to the due date, and (3) when a start date of an order and a leadtime are given, the result of calculation is a due date of the order corresponding to the operating day address which is obtained by adding the leadtime to the operating date address corresponding to the start date.

11. A level-by-level explosion method for material requirements planning as claimed in claim 10, wherein, when the calendar date is earlier than the operating date at the tops of the table positions, "0" is set to the corresponding operating day address.

12. A level-by-level explosion method for material requirements planning as claimed in claim 10, wherein the step of calculating a result of calculation refers to the composite calendar table which includes a plurality of operating day calendars to calculate a number of results of calculation equal to the number of operating day calendars for one calculation condition.

13. A level-by-level explosion method for material requirements planning as claimed in claim 8, wherein the third step includes, using the management table which includes,

- a key area in which pieces of demand information including part numbers for identification of items, low level codes indicating absolute levels of the items in the bill of material and required timings at which the items are required are registered at a plurality of positions arrayed in order as well as a data area in which other demand information is stored,
- a sub table in which, in an initial state thereof, values equal to order numbers are stored at a plurality of positions arrayed in order, and
- an entry point in which, in an initial state thereof, "the number of registered pieces of demand information+1" is written, the method comprising the steps of:
- registering new demand information into the level-by-level explosion management table in the following order;
  (1) registering the demand information into the position of the key area at an order number of the value of the sub table at an order number indicated by the value of the entry point;
  (2) setting the order number of the position of the key area into which the demand information is registered in the processing at (1) as j;
  (3) setting, for j determined by the processing at (2) or (4), i to a value equal to an integer portion of j/2 with fractions omitted;
  (4) comparing, for i and j determined by the processing at (3), contents I and J at the ith and jth positions of the key area in accordance with a predetermined order in magnitude, and, when I≦J, performing ending processing at (5), but when I>J, replacing the contents at the ith and jth positions of the key area with each other, setting j to an equal value to the value of i and repeating the processing beginning with (3) again; and
  (5) finally incrementing, as the ending processing, the value of the entry point by one and ending the registration operation; and
- extracting the demand information from the management table;
  (1) first extracting the demand information which is contents at the first position of the key area; −(2) setting, after the processing at (1), i, j and k to initial values of 1, 2 and 3, respectively;
  (3) comparing, for i, j and k set by the processing at (2), contents J and K at the jth and kth positions of the key area with each other in accordance with the predetermined order, and, when J<K, substituting the contents J at the jth position of the key area into the ith position and setting i to an equal value to that of j and then performing the processing at (4), but when J>K, substituting contents K at the kth position of the key area into the ith position and setting i to an equal value to that of k and then performing the processing at (4), but otherwise when J=K, writing into the ith position of the key area a code indicating that the ith position is empty and then performing ending processing at (5);
  (4) setting, for i determined by the processing at (3), j to a value equal to i×2 and setting k equal to a value of j+1, and repeating the processing at (3); and
  (5) finally writing, as the ending processing, into the ith position of the key area a code indicating that the ith position is empty, decrementing the value of the entry point by one and substituting i into the position of the sub table of the order number of the value of the entry point.

* * * * *